(12) United States Patent
Zhou et al.

(10) Patent No.: US 10,195,568 B2
(45) Date of Patent: Feb. 5, 2019

(54) MEMBRANE SEPARATION DEVICE

(71) Applicants: XiaoShan Zhou, Anhui (CN); Ming Sun, Jiangsu (CN); Ji Lei, Guangzhou (CN)

(72) Inventors: XiaoShan Zhou, Anhui (CN); Ming Sun, Jiangsu (CN); Ji Lei, Guangzhou (CN)

(73) Assignee: IP TECH PTE. LTD., Singapore (SG)

( * ) Notice: Subject to any disclaimer, the term of this patent is extended or adjusted under 35 U.S.C. 154(b) by 306 days.

(21) Appl. No.: 15/036,639

(22) PCT Filed: Nov. 19, 2013

(86) PCT No.: PCT/CN2013/087374
§ 371 (c)(1),
(2) Date: May 13, 2016

(87) PCT Pub. No.: WO2015/070469
PCT Pub. Date: May 21, 2015

(65) Prior Publication Data
US 2016/0288055 A1 Oct. 6, 2016

(30) Foreign Application Priority Data
Nov. 15, 2013 (CN) .......................... 2013 1 0571976

(51) Int. Cl.
*B01D 53/22* (2006.01)
*B01D 63/02* (2006.01)
(Continued)

(52) U.S. Cl.
CPC ............. *B01D 63/16* (2013.01); *B01D 63/02* (2013.01); *B01D 63/08* (2013.01); *B01D 63/087* (2013.01);
(Continued)

(58) Field of Classification Search
CPC ........ B01D 53/22; B01D 63/02; B01D 63/08; B01D 63/087; B01D 63/16; B01D 2313/18; B01D 2313/20; B01D 2315/02
See application file for complete search history.

(56) References Cited

U.S. PATENT DOCUMENTS 3,475,331 A * 10/1969 McLain ................. B01D 63/02
210/321.88
4,968,600 A 11/1990 Haraguchi et al.
(Continued)

FOREIGN PATENT DOCUMENTS

CA 2178118 C * 6/2002 ............. C02F 1/441
CN 87103201 A 12/1987
(Continued)

OTHER PUBLICATIONS

English language machine translation for CN 102728188 A. Retrieved from http://translationportal.epo.org on Jun. 26, 2018. (Year: 2018).*
(Continued)

*Primary Examiner* — Jason M Greene
(74) *Attorney, Agent, or Firm* — Maier & Maier, PLLC

(57) ABSTRACT

A membrane separation apparatus includes: a shell, wherein an inner surface of the shell is an arc surface, and at least one medium inlet and at least one medium outlet used for discharging a medium that is separated are arranged on the shell; a rotor arranged inside the shell, wherein at least two contact ends that are always in slidably contact with the inner surface of the shell are arranged on an outer surface of the rotor, the outer surface of the rotor and the inner surface of the shell form sealed separate cavities between the adjacent contact ends, and an empty part inside the rotor is used as a medium storage chamber; and separation chambers arranged inside the rotor.

8 Claims, 14 Drawing Sheets

(51) Int. Cl.
  *B01D 63/08* (2006.01)
  *B01D 63/16* (2006.01)
(52) U.S. Cl.
  CPC .......... *B01D 53/22* (2013.01); *B01D 2313/20* (2013.01); *B01D 2313/24* (2013.01); *B01D 2313/243* (2013.01); *B01D 2315/02* (2013.01)

(56) References Cited

U.S. PATENT DOCUMENTS

| | | | | |
|---|---|---|---|---|
| 5,143,630 | A | * | 9/1992 | Rolchigo ............... B01D 63/16 210/780 |
| 5,263,924 | A | * | 11/1993 | Mathewson ........... B01D 63/02 422/44 |
| 5,830,370 | A | * | 11/1998 | Maloney, Jr. ....... A61M 1/1698 210/780 |
| 6,132,613 | A | | 10/2000 | Hopkin et al. |
| 2013/0015120 | A1 | * | 1/2013 | Luer ...................... B01D 63/16 210/330 |
| 2015/0175440 | A1 | * | 6/2015 | Schoendorfer ........ B01D 63/16 210/787 |

FOREIGN PATENT DOCUMENTS

| | | | | |
|---|---|---|---|---|
| CN | 1276268 | A | | 12/2000 |
| CN | 102728188 | A * | 10/2012 | ............. B01D 53/22 |
| WO | WO 2007/091539 | A1 * | 8/2007 | ............. B01D 53/04 |

OTHER PUBLICATIONS

International Search Report of corresponding PCT/CN2013/087374 dated Aug. 8, 2014; 2 pgs.

* cited by examiner

MEMBRANE SEPARATION DEVICE

TECHNICAL FIELD

The invention relates to a membrane separation device, which is mainly applied to the technical field of gas (liquid) medium separation.

BACKGROUND

Membrane separation, a new separation technique which emerged in the early 20th century and has rapidly developed since the 1960s, refers to a technique in which selective separation is effected when a mixture of molecules of different particle sizes passes through a semi-permeable membrane at the molecular level. The semi-permeable membrane is also referred to as a separation membrane or filtration membrane, full of pores in a membrane wall, and according to the pore sizes, can be categorized into: a microfiltration (MF) membrane, an ultrafiltration (UF) membrane, a nanofiltration (NF) membrane, a reverse osmosis (RO) membrane, etc., which all use the cross-flow filtration for membrane separation. Due to its functions of separation, concentration, purification, and refinement and its characteristics of high efficiency, energy efficiency, environmental friendliness, molecular-level filtration, simple filtration process, and easy control, the membrane separation technique has been widely used in the fields of, such as, foods, medicines, biology, environmental protection, chemical engineering, metallurgy, energy resources, petroleum, water treatments, electronics, and bionics, bringing substantial economic benefits and social benefits, and has become one of the most important approaches in current separation science. The membrane separation technique, including membrane materials, membrane assembly and optimization, membrane techniques, etc., of which the research and development has been continuously made, has become a hot spot for competition in the fields of high and new technologies between various nations in the world.

BRIEF DESCRIPTION OF THE INVENTION

The present invention provides a membrane separation device having a simple and compact structure in which gas compression (or a liquid pump) is integrated with separation chambers without the need of the complex gas (liquid) pipeline. It is mainly characterized by high integration, high permeability per unit volume of the device, and low cost, and in particular, no substantial increase in volume and cost in case of using in a multistage coaxial form in series, which is highly advantageous for solving the problem of too low separation concentration of the current membrane separation device.

The present invention is realized by the following technical solutions: a membrane separation device, comprising:

a housing having an arc-shaped inner surface, the housing being provided with at least one medium inlet and at least one medium outlet used for discharging a separated medium;

a rotor provided in the housing, the rotor being provided with at least two contact ends on an outer surface thereof, the at least two contact ends being constantly in sliding contact with the inner surface of the housing, the outer surface of the rotor and the inner surface of the housing forming sealed separate cavities between the adjacent contact ends, the separate cavities being separated by the contact ends, the inside of the rotor being hollow, and a hollow part inside the rotor being used as a medium storage chamber;

separation chambers, provided inside the rotor as a part of the rotor, one separation chamber being defined between the adjacent contact ends, each of the separation chambers being filled with a membrane therein for dividing the separation chamber into two parts, one inner part and one outer part, one-way valves corresponding to the separate cavities being provided on outer walls of the separation chambers for communicating with the separate cavities, medium outlets corresponding to the medium storage chamber being provided on inner walls of the separation chambers, the medium storage chamber being in communication with the medium outlets on the housing;

wherein during the rotation of the rotor, a medium entering the separate cavities through the medium inlets on the housing enters the separation chambers through the one-way valves under pressure, and the separated medium passes through the membranes and enters the medium storage chamber from the medium outlets on the inner walls of the separation chambers, and then exits through the medium outlets on the housing.

A flat membrane may be used as the membrane. When the flat membrane is used, the separated medium passes through the flat membranes to enter the gas storage chamber from the medium outlets.

When the flat membrane is used, preferably, at least one medium discharge port for discharging the remaining medium is further provided on the housing;

the medium storage chamber of the rotor is divided into two parts by a divider: a first medium storage chamber for storing the separated medium and a second medium storage chamber for storing the remaining medium;

the medium outlets corresponding to the first medium storage chamber are provided on the inner walls of the separation chambers, spaces between the membranes and the outer walls of the separation chambers are in communication with the second medium storage chamber through conduits, the first medium storage chamber is in communication with the medium outlets on the housing, and the second medium storage chamber is in communication with the medium discharge ports on the housing;

during the rotation of the rotor, a medium entering the separate cavities through the medium inlets on the housing enters the separation chambers through the one-way valves under pressure, and the separated medium passes through the membranes and enters the first gas storage chamber from the medium outlets on the inner walls of the separation chambers, and the remaining medium enters the second gas storage chamber through the conduits, and then is discharged through the medium discharge ports on the housing.

A hollow fiber tubular membrane may also be used as the membrane. When the hollow fiber tubular membrane is used, outlets of the hollow fiber tubular membranes are in communication with the medium outlets on the inner walls of the separation chambers, and the separated medium passes through tubes of the hollow fiber tubular membranes and then enters the medium storage chamber from the medium outlets on the inner walls of the separation chambers.

When the hollow fiber tubular membrane is used, preferably, at least one medium discharge port for discharging the remaining medium is further provided on the housing;

the medium storage chamber of the rotor is divided into two parts by a divider: a first medium storage chamber for storing the separated medium and a second medium storage chamber for storing the remaining medium;

the medium outlets corresponding to the first medium storage chamber are provided on the inner walls of the separation chambers, a medium discharge port in communication with the second medium storage chamber is provided on the inner wall of each of the separation chambers, the first medium storage chamber is in communication with the medium outlets on the housing, and the second medium storage chamber is in communication with the medium discharge ports on the housing;

during the rotation of the rotor, a medium entering the separate cavities through the medium inlets on the housing enters the separation chambers through the one-way valves under pressure, and the separated medium passes through the membranes and enters the first medium storage chamber from the medium outlets on the inner walls of the separation chambers, and the remaining medium enters the second gas storage chamber through the medium discharge ports on the inner walls of the separation chambers, and then is discharged through the medium discharge ports on the housing.

Specifically, the center of the rotor is not coincident with the center of the housing, and the center of the rotor rotates about the center of the housing during the rotation of the rotor. The membrane separation device further comprises an external gear fixed on a drive shaft at the center of the housing, and the rotor is provided with an internal gear at the center thereof; the external gear is engaged with the internal gear, and the external gear has fewer teeth than the internal gear.

In one embodiment, the housing has a symmetrical arc-shaped inner surface, and the arc-shaped trajectory of the inner surface is obtained through the following equations:

$$x = R^* \cos \alpha + e^* \cos 3\alpha;$$

$$y = R^* \sin \alpha + e^* \sin 3\alpha;$$

the contour line of the rotor is obtained through the following equations:

$$v = 30 + t^* 60$$

$$d = -3^* e^* \sin(3^* v)/R$$

$$u = 2^* v - a \sin(d)$$

$$x = 2^* e^* \cos(u)^* \cos(3^* v) + R^* \cos(2^* v)$$

$$y = 2^* e^* \sin(u)^* \cos(3^* v) + R^* \sin(2^* v)$$

In the above equations, R is a generating radius, e is a distance between the center of the rotor and the center of the housing, $\alpha \in [0°, 360°]$, and t is time.

In the embodiment, two sides of the housing are provided with a gas inlet respectively in a radial direction, and two sides of the housing are provided with an end cover respectively in an axial direction; the end cover on one side is provided with an end surface medium discharge port, and the end cover on the other side is provided with an end surface medium outlet; the rotor is provided with three contact ends constantly in sliding contact with the inner surface of the housing; the gas storage chamber is divided into two parts by a divider: a first gas storage chamber for storing the separated gas and a second gas storage chamber for storing the remaining gas; the separated medium passes through the membranes in the separation chambers and enters the first gas storage chamber, and the remaining medium enters the second gas storage chamber; the end surface medium outlet is in communication with the first gas storage chamber, and the end surface medium discharge port is in communication with the second gas storage chamber.

In another embodiment, the arc-shaped trajectory of the inner surface of the housing is obtained through the following equations:

$$x = e^* \cos(\alpha) + R^* \cos(\alpha/4)$$

$$Y = e^* \sin(\alpha) + R^* \sin(\alpha/4)$$

the contour line of the rotor is obtained through the following equations:

$$x_r = e^* \cos \beta + e^* \cos(\alpha - \beta/3) + R^* \cos(\alpha/4 - \beta/3)$$

$$y_r = e^* \cos \beta + e^* \sin(\alpha - \beta/3) + R^* \sin(\alpha/4 - \beta/3)$$

$$tg(5\beta/8) = \frac{5\sin(\alpha/2) - K \sin(3\alpha/10)}{5\cos(\alpha/2) + K \cos(3\alpha/10)}$$

In the above equations, $\alpha \in [0°, 360°]$, e is an eccentric distance, R is a generating radius, and K=R/e.

The medium may be a gas medium or a liquid medium.

The present invention has the following benefits:

Compared to the conventional structure, in the structure of the present invention, the separation chambers are provided inside the rotor, such that the whole device has a reasonable layout and a more compact structure without the need of complex gas (liquid) pipeline. In addition, membranes are used for medium separation, resulting in high permeability per unit volume of the device and low cost, and in particular, no substantial increase in volume and cost in case of using in a multistage coaxial form in series with a higher separation concentration, which is a new membrane separation device having better performance.

DETAILED DESCRIPTION OF THE PRESENT INVENTION

The present invention is further described in detail in combination with the drawings and embodiments.

Embodiment 1

Figure 1:
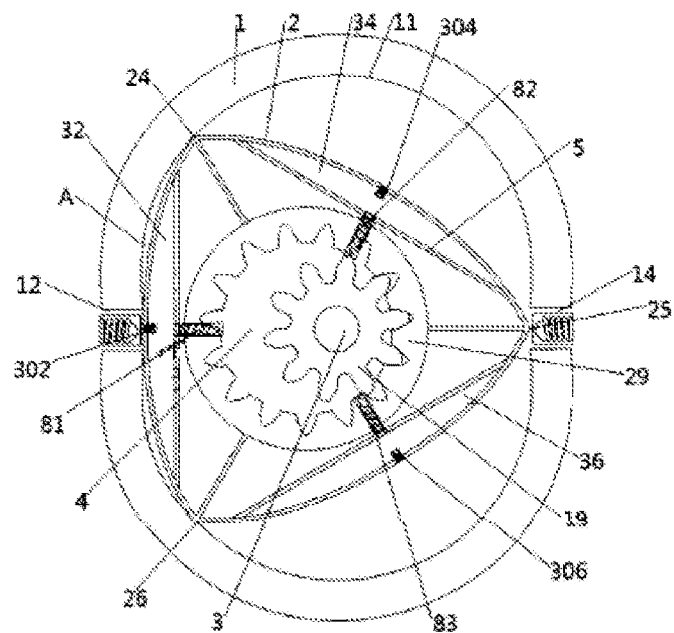
FIGS. 1-8 are schematic structural views of a triangular-rotor flat-membrane separation device according to an embodiment 1 of the present invention.
Figure 2:
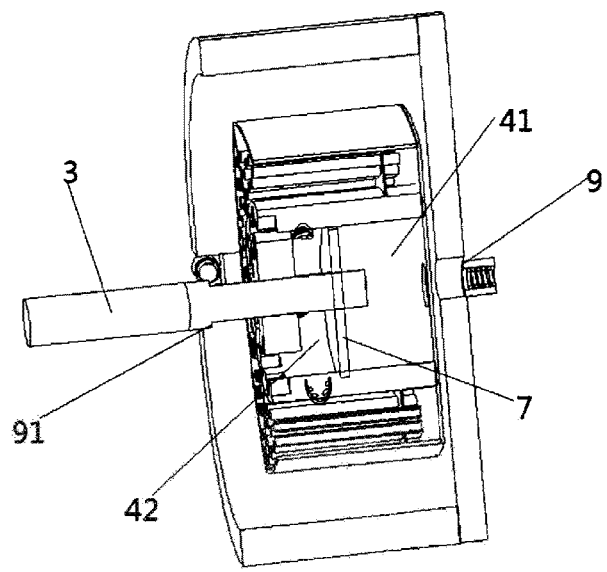
Figure 3:
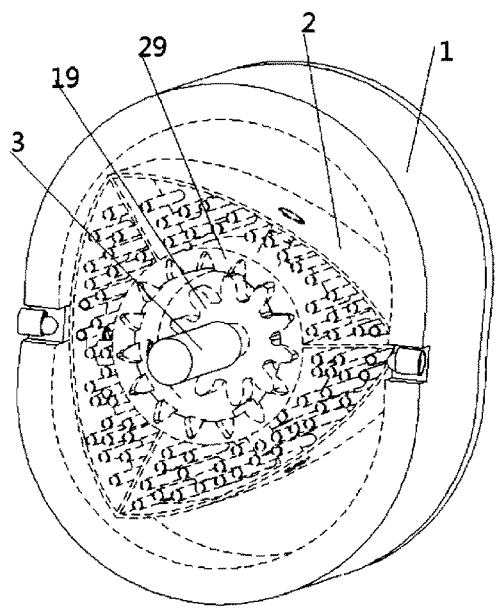
Figure 4:
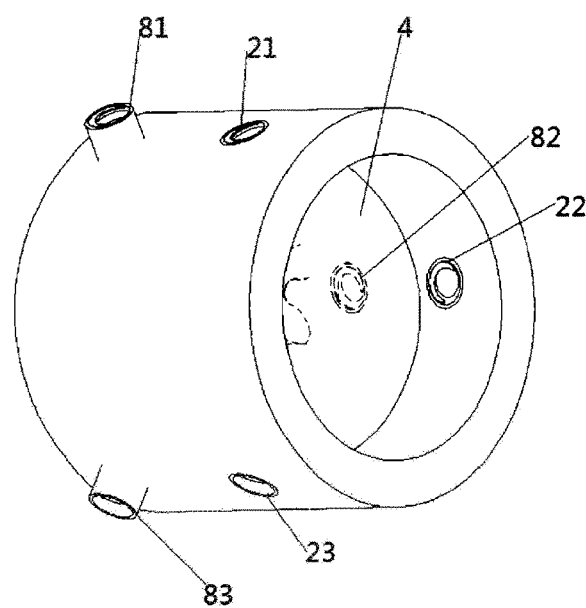
Figure 5:
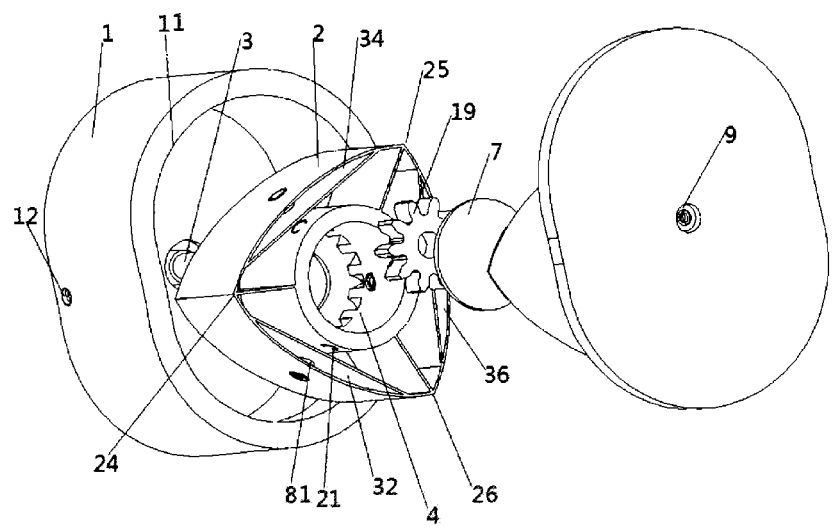
Figure 6:
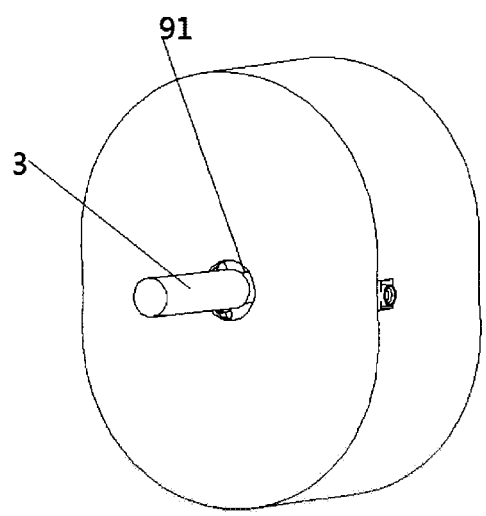
Figure 7:
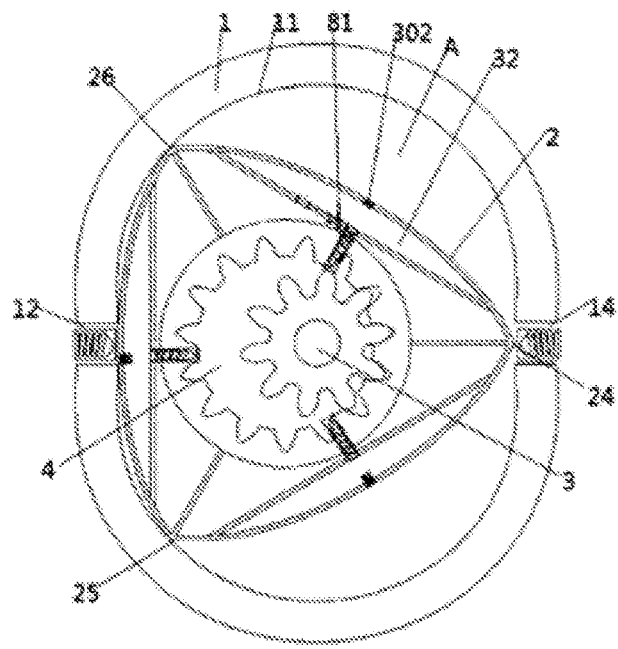
Figure 8:
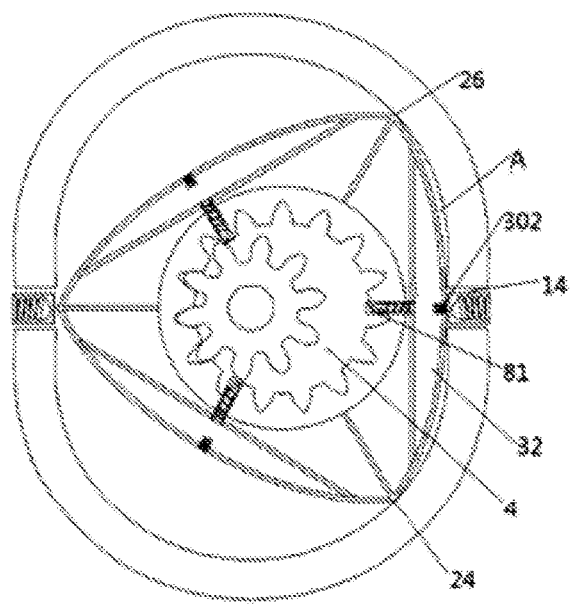

FIG. 1, FIG. 7, and FIG. 8 are front views of the flat-membrane separation device of the present invention, FIG. 2 is a cross-sectional side view of the flat-membrane separation device of the present invention, FIG. 3 is an oblique view of the flat-membrane separation device of the present invention, FIG. 4 is an oblique side view of a gas storage chamber module of the flat-membrane separation device of the present invention, FIG. 5 is an overall exploded view of the flat-membrane separation device of the present invention, and FIG. 6 is an oblique view of an end cover at one side of an gas discharge port of the flat-membrane separation device of the present invention. Referring to FIGS. 1-8, the flat-membrane separation device in the present embodiment includes a housing 1 and a rotor 2.

The housing 1 has an arc-shaped inner surface 11, and the arc-shaped trajectory of the inner surface of the housing is obtained through the following equations:

$$x=R*\cos \alpha + e*\cos 3\alpha;$$

$$y=R*\sin \alpha + e*\sin 3\alpha;$$

$$\alpha \in [0°, 360°] \, e=1.5 \, R=10.$$

Each of two sides of the housing 1 in a radial direction is provided with a gas inlet 12, 14 respectively. Two sides of the housing 1 in an axial direction are provided with two end covers. The end cover on one side is provided with a gas discharge port 91, and the end cover on the other side is provided with a gas outlet 9. A relief valve is provided in the gas outlet 9.

The rotor 2 is rotatably provided in the housing 1. The rotor 2 is provided with three contact ends constantly in sliding contact with the inner surface 11 of the housing 1, marked as a contact end 24, a contact end 25, and a contact end 26, respectively. The contour line of the rotor 2 is obtained through the following equation:

$$e=1.5 \, R=10$$

$$v=30+t*60$$

$$d=-3*e*\sin(3*v)/R$$

$$u=2*v-a\sin(d)$$

$$x=2*e*\cos(u)*\cos(3*v)+R*\cos(2*v)$$

$$y=2*e*\sin(u)*\cos(3*v)+R*\sin(2*v)$$

The rotor 2 and the inner surface 11 of the housing form sealed separate cavities between the adjacent contact ends. When the device is used for gas separation, the separate cavities are gas cavities, and when the device is used for liquid separation, the separate cavities are liquid cavities. For convenience of description, gas separation is taken as an example in the embodiment. A hollow part inside the rotor 2 is used as a gas storage chamber 4. The gas storage chamber 4 is divided into two parts by a divider 7: a gas storage chamber 41 and a gas storage chamber 42. The gas storage chamber 41 is configured to store the separated gas and the gas storage chamber 42 is configured to store the remaining gas. The gas outlet 9 on one end surface of the housing 1 is in communication with the gas storage chamber 41 for discharging the separated gas, and the gas discharge port 91 on the other end surface of the housing 1 is in communication with the gas storage chamber 42 for discharging the remaining gas.

Separation chambers are provided inside the rotor 2 as a part of the rotor, one separation chamber is defined between the adjacent contact ends, and the separation chambers are isolated from each other. Referring to FIG. 1, in the present embodiment, a separation chamber 32 is formed between the contact end 24 and the contact end 26, a separation chamber 34 is formed between the contact end 24 and the contact end 25, and a separation chamber 36 is formed between the contact end 25 and the contact end 26. Each of the separation chambers is filled with a flat membrane 5 therein for dividing the separation chamber into two spaces, one inner space and one outer space. One-way valves 302, 304, 306 corresponding to the gas cavities are provided on outer walls of the separation chambers for communicating with the gas cavities. Also referring to FIG. 4, gas outlets corresponding to the gas storage chamber 41 are provided on inner walls of the separation chambers, where a gas outlet 21 is provided on the inner wall of the separation chamber 32, a gas outlet 22 is provided on the inner wall of the separation chamber 34, and a gas outlet 23 is provided on the inner wall of the separation chamber 36. The gas outlet 21, the gas outlet 22, and the gas outlet 23 are provided with one-way valves therein, and gas can only enter the gas storage chamber 41 from the separation chambers. Spaces between the flat membranes 5 in the three separation chambers and the outer walls of the separation chambers are in communication with the gas storage chamber 42 through conduits, where a conduit 81 is provided between the separation chamber 32 and the gas storage chamber 42, a conduit 82 is provided between the separation chamber 34 and the gas storage chamber 42, and a conduit 83 is provided between the separation chamber 36 and the gas storage chamber 42. The remaining gas enters the gas storage chamber 42 through the conduits, and gas discharge ends of the conduit 81, the conduit 82, and the conduit 83 are provided with relief valves.

In the present embodiment, referring to FIG. 3, the center of the rotor 2 is not coincident with the center of the housing 1, and the center of the rotor 2 rotates about the center of the housing 1 during rotation of the rotor 2. More specifically, the housing 1 is provided with an external gear 19 at the center thereof, with the center of the external gear 19 fixed on a drive shaft 3, and the rotor 2 is provided with an internal gear 29 at the center thereof; the external gear 19 is engaged with the internal gear 29, and the external gear 19 has fewer teeth than the internal gear 29. Referring to FIG. 5 and FIG. 6, the gas discharge port 91 on the housing 1 is provided on the end cover at one side close to the drive shaft 3, and the gas outlet 9 is provided on the end cover at the other side.

The working process of the flat-membrane gas separation device of the present invention is as follows.

Referring to FIG. 1 which shows an initial phase, the contact end 24 of the rotor 2 is at the clockwise side of the gas inlet 12, and the contact end 26 is at the counterclockwise side of the gas inlet 12; that is, an air cavity A formed by the separation chamber 32, the contact ends 24 and 26 and the inner surface 11 of the housing is in an intake process of a new phase; the torque transmitted by the drive shaft 3 drives the external gear 19 to rotate and thus drives the rotor 2 to rotate clockwise, and after the contact end 26 on the rotor 2 moves clockwise and passes the gas inlet 12, the intake process is completed. During this process, the volume of the air cavity A gradually increases.

Referring to FIG. 5 and FIG. 7, a compression process and a gas output preparation phase are shown in FIG. 7. The contact end 24 slides to the gas outlet 14. As the rotor 2 continues rotating clockwise, the volume of the gas cavity A is further decreased. In this process, the gas cavity A compresses gas to enter the separation chamber 32 through the one-way valve and then pass through the flat membrane. Since different gases pass through the flat membrane 5 at different rates under the same pressure, in one unit of time, more gases having faster permeation rate pass through the membrane than gases having slower permeation rate, thereby achieving the effect of gas separation. Referring to FIG. 5 and FIG. 6, the separated gas enters the gas storage chamber 41 through the gas outlet 21 and then exits through the gas outlet 9 on the end cover at this side. The remaining gas left in the separation chamber 32 is discharged to the gas storage chamber 42 through the conduit 81 and then exits through the gas discharge port 91 on the end cover at the other side. When the pressure of the remaining gas in the separation chamber 32 reaches a threshold of the relief valve at the gas discharge end of the conduit 81, the valve is closed to stop the gas discharge.

Referring to FIG. 8 which shows a new intake phase; as the rotor 2 continuously rotates clockwise, the volume of the air cavity A gradually decreases; in this phase, the volume of the air cavity A reaches the minimum, and the phase proceeds to the intake, gas compression, and gas separation processes of the next phase.

Embodiment 2

Figure 9:
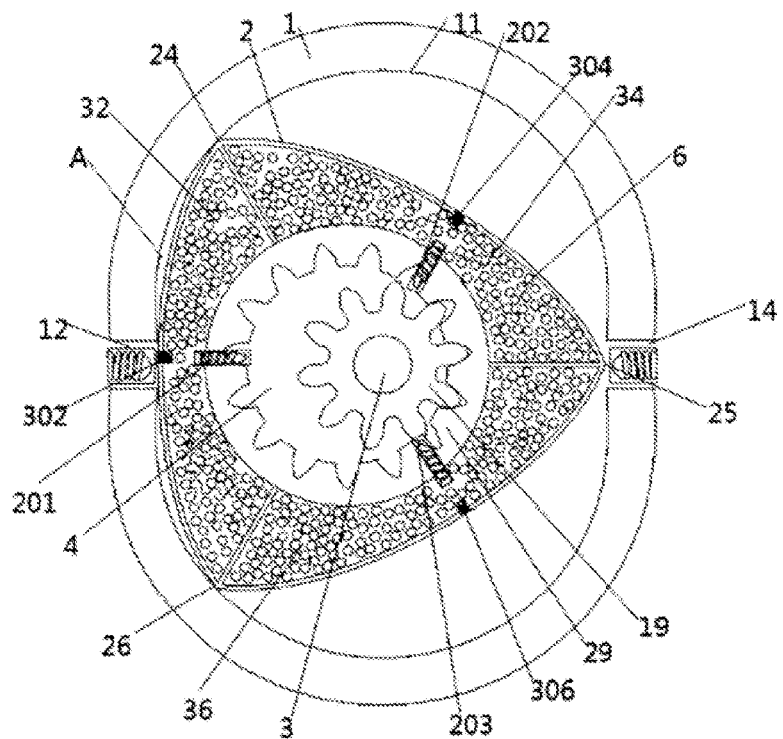
FIGS. 9-14 are schematic structural views of a triangular-rotor fiber tubular-membrane separation device according to an embodiment 2 of the present invention.
Figure 10:
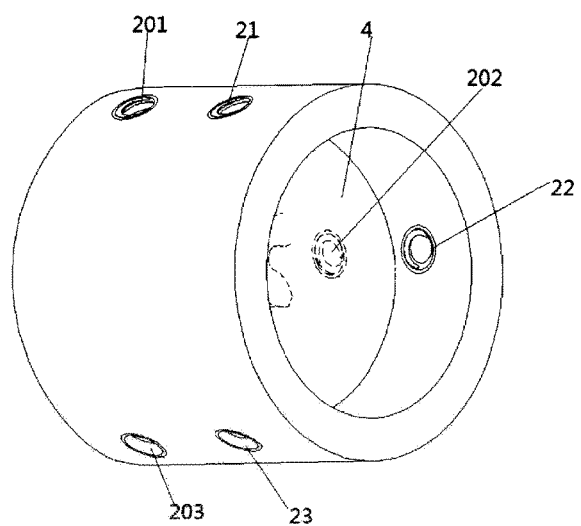
Figure 11:
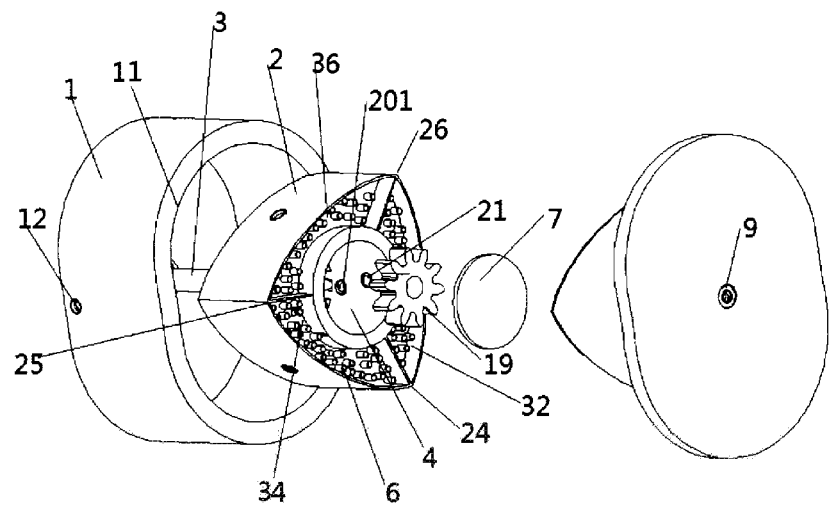
Figure 12:
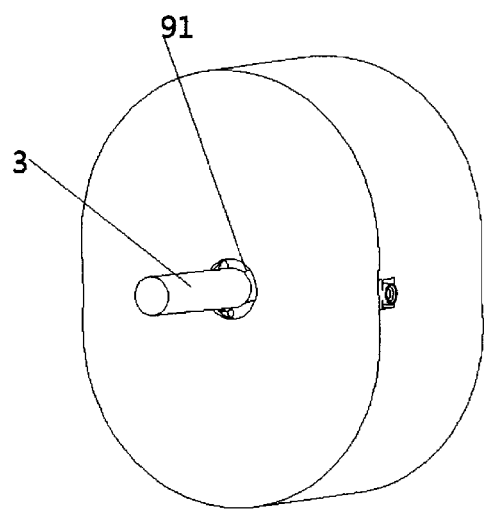
Figure 13:
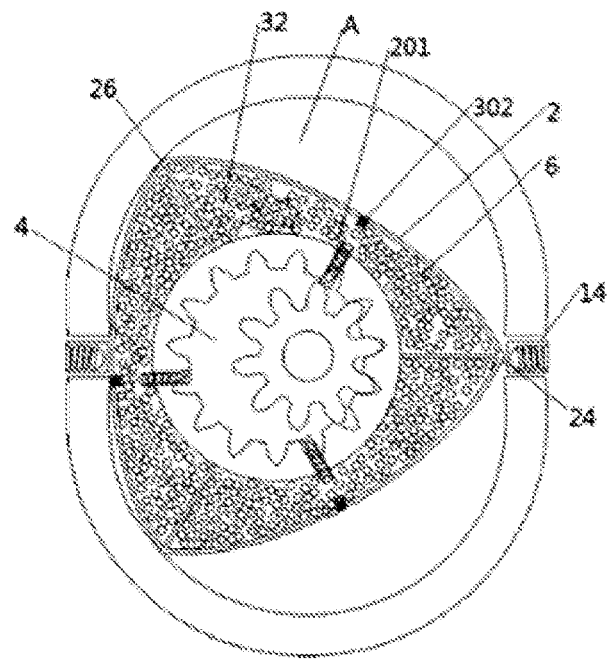
Figure 14:
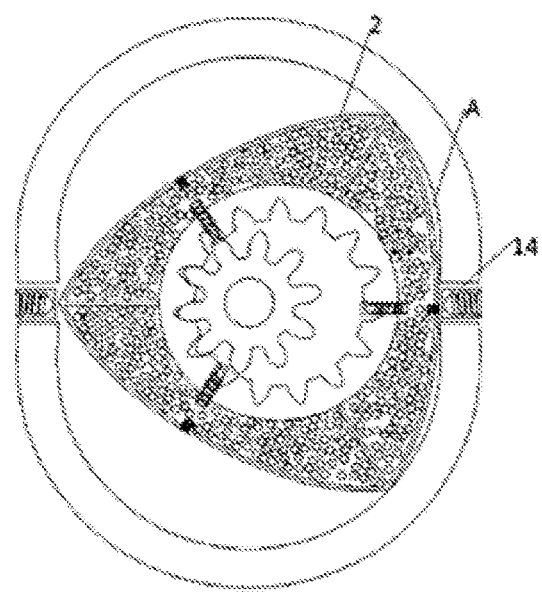

FIG. 9, FIG. 13, and FIG. 14 are front views of the hollow fiber tubular-membrane separation device of the present invention, FIG. 10 is an oblique view of a gas storage chamber module of the hollow fiber tubular-membrane separation device of the present invention, FIG. 11 is an overall exploded view of the hollow fiber tubular-membrane separation device of the present invention, and FIG. 12 is an oblique view of an end cover at one side of an gas discharge port of the hollow fiber tubular-membrane separation device of the present invention. The structure of the membrane separation device in the present embodiment is basically the same as that in the embodiment 1, and the only difference is that each of the separation chambers is filled with the hollow fiber tubular membrane instead of the flat membrane 5 in the embodiment 1, where outlets of the hollow fiber tubular membranes 6 in the separation chambers are in communication with the gas outlets on the inner walls of the corresponding separation chambers, namely, the outlet of the hollow fiber tubular membrane 6 in the separation chamber 32 is in communication with the gas outlet 21 on the inner wall of the separation chamber 32, the outlet of the hollow fiber tubular membrane 6 in the separation chamber 34 is in communication with the gas outlet 22 on the inner wall of the separation chamber 34, and the outlet of the hollow fiber tubular membrane 6 in the separation chamber 36 is in communication with the gas outlet 23 on the inner wall of the separation chamber 36. Because of the characteristics of the hollow fiber tubular membrane 6, it is not required to provide the conduits in the embodiment 1 to discharge the remaining gas, and it only requires to provide gas discharge ports in communication with the gas storage chamber 42 on the inner walls of the separation chambers, where a gas discharge port 201 is provided between the separation chamber 32 and the gas storage chamber 42, a gas discharge port 202 is provided between the separation chamber 34 and the gas storage chamber 42, and a gas discharge port 203 is provided between the separation chamber 36 and the gas storage chamber 42. The gas discharge port 201, the gas discharge port 202, and the gas discharge port 203 are provided with relief valves, see FIG. 10.

The working process of the hollow fiber tubular-membrane gas separation device of the present invention is as follows.

Referring to FIG. 9 which shows an initial phase, the contact end 24 of the rotor 2 is at the clockwise side of the gas inlet 12, and the contact end 26 is at the counterclockwise side of the gas inlet 12; that is, an air cavity A formed by the separation chamber 32, the contact ends 24 and 26 and the inner surface 11 of the housing is in an intake process of a new phase; the torque transmitted by the drive shaft 3 drives the external gear 19 to rotate and thus drives the rotor 2 to rotate clockwise, and after the contact end 26 on the rotor 2 moves clockwise and passes the gas inlet 12, the intake process is completed. During this process, the volume of the air cavity A gradually increases.

Referring to FIG. 11 and FIG. 13, a compression process and a gas output preparation phase are shown in FIG. 13. The contact end 24 slides to the gas inlet 14. As the rotor 2 continues rotating clockwise, the volume of the gas cavity A is further decreased. In this process, the gas cavity A compresses gas to enter the separation chamber 32 through the one-way valve and then pass through the hollow fiber tubular membrane 6. Since different gases pass through the tubular membrane at different rates, in one unit of time, more gases having faster permeation rate pass through the membrane than gases having slower permeation rate, thereby achieving the effect of gas separation. Referring to FIG. 11 and FIG. 12, the separated gas exits the outlet of the hollow fiber tubular membrane 6, enters the gas storage chamber 41 through the gas outlet 21 and then exits through the gas outlet 9 on the end cover at this side. The remaining gas enters the gas storage chamber 42 through the gas discharge port 201 and then is discharged through the gas discharge port 91 on the end cover at the other side. When the pressure of the remaining gas in the separation chamber 32 reaches a threshold of the relief valve in the gas discharge port 201 on the inner wall of the separation chamber 32, the valve is closed to stop the gas discharge.

Referring to FIG. 14 which shows a new intake phase, as the rotor 2 continuously rotates clockwise, the volume of the air cavity A gradually decreases; in this phase, the volume of the air cavity A reaches the minimum, and the phase proceeds to the intake, gas compression, and gas separation processes of the next phase.

Embodiment 3

Figure 15:
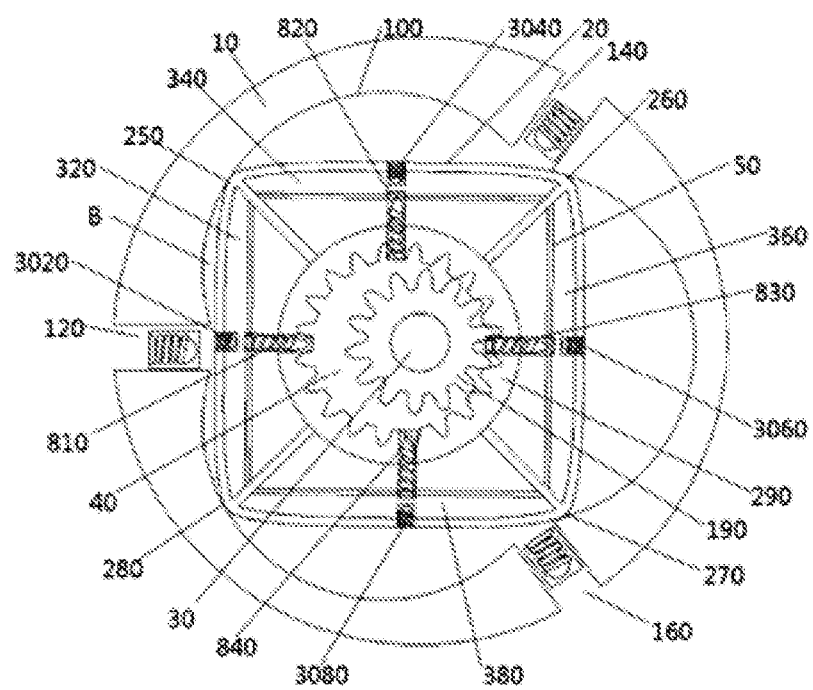
FIGS. 15-22 are schematic structural views of a tetragonal-rotor flat-membrane separation device according to an embodiment 3 of the present invention.
Figure 16:
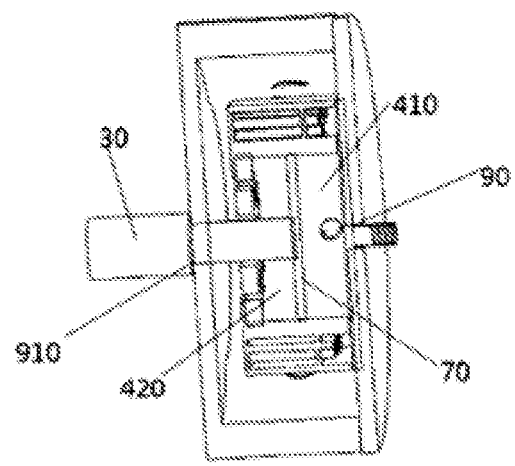
Figure 17:
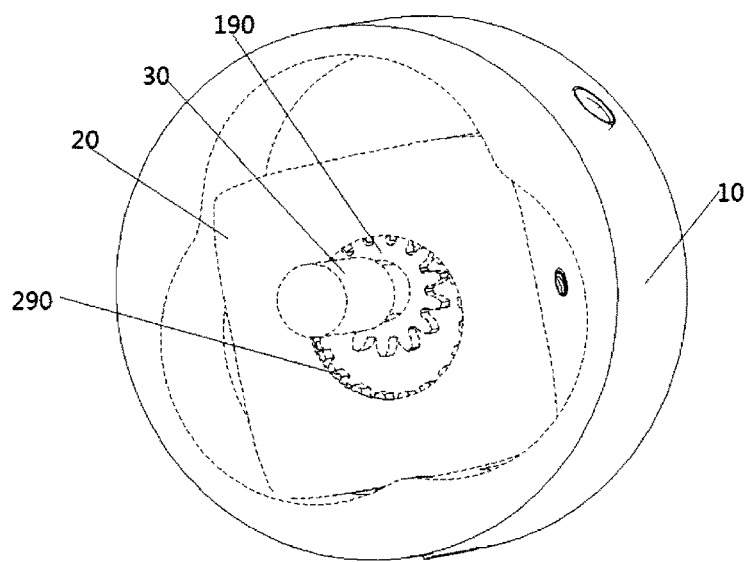
Figure 18:
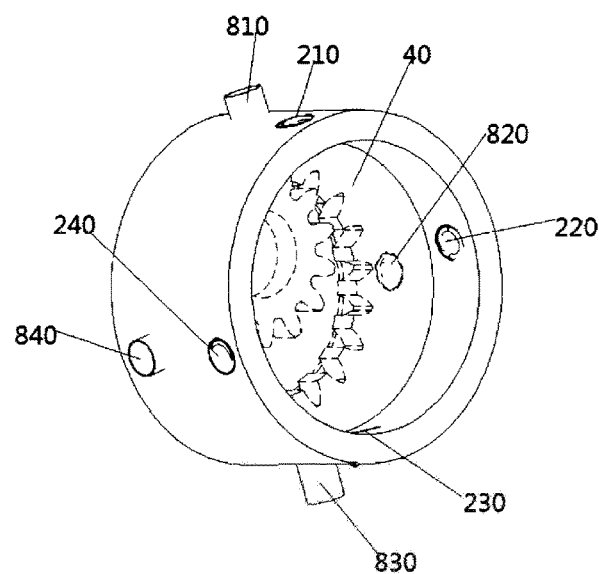
Figure 19:
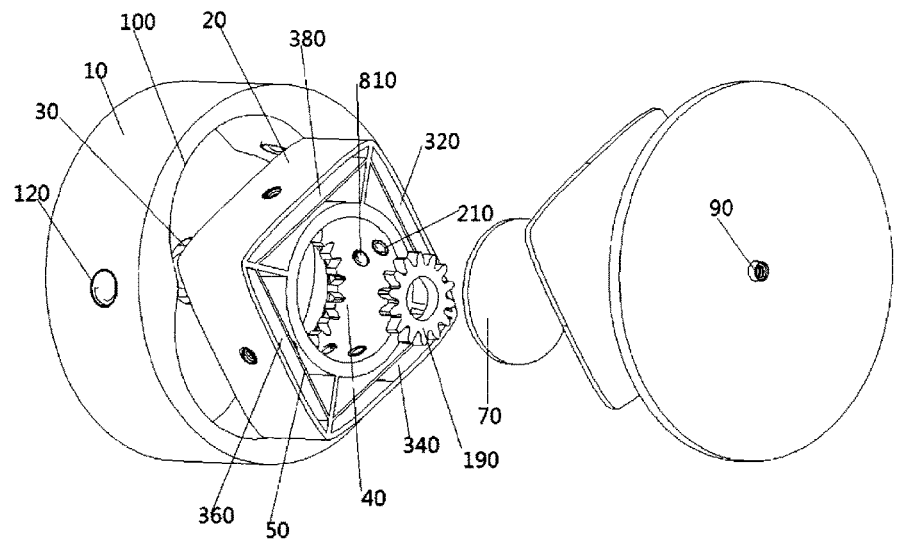
Figure 20:
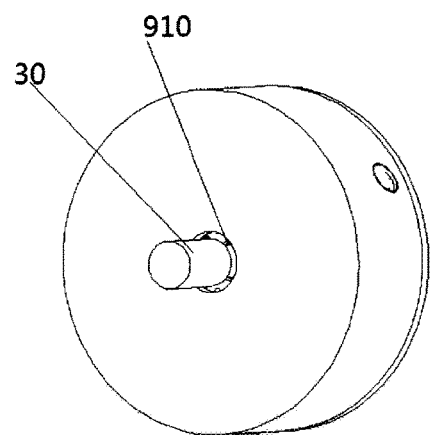
Figure 21:
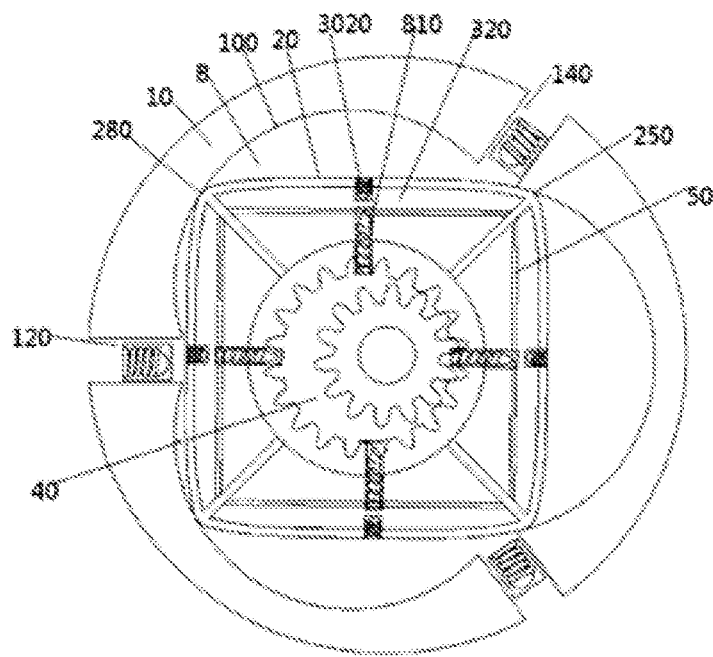
Figure 22:
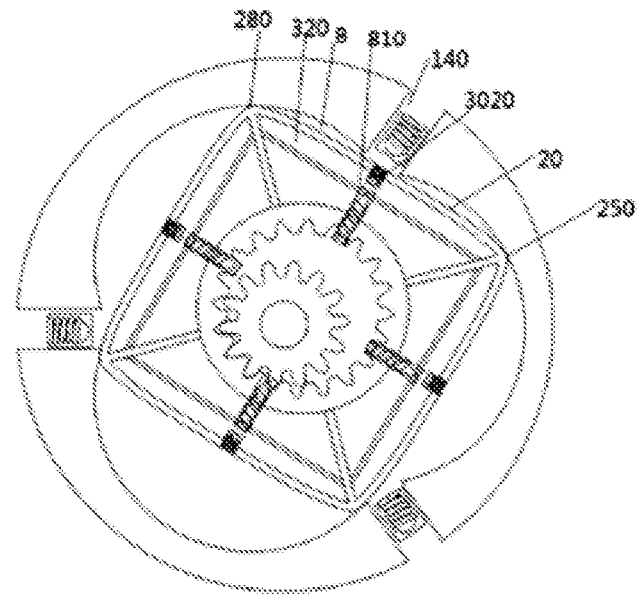

FIG. 15, FIG. 21, and FIG. 22 are front views of the flat-membrane separation device of the present invention, FIG. 16 is a cross-sectional side view of the flat-membrane separation device of the present invention, FIG. 17 is an oblique view of the flat-membrane separation device of the present invention, FIG. 18 is an oblique view of a gas storage chamber module of the flat-membrane separation device of the present invention, FIG. 19 is an overall exploded view of the flat-membrane separation device of the present invention, and FIG. 20 is an oblique view of an end cover at one side of an gas discharge port of the flat-membrane separation device of the present invention. The flat-membrane separation device in the present embodiment includes a housing 10 and a rotor 20.

The housing 10 has an arc-shaped inner surface 100 consisting of three concentric and continuous arc surfaces having the same curvature, and the arc-shaped trajectory of the inner surface of the housing is obtained through the following equations:

$$x = e^* \cos(\alpha) + R^* \cos(\alpha/4)$$

$$Y = e^* \sin(\alpha) + R^* \sin(\alpha/4)$$

$\alpha \in [0°, 360°]$, e is an eccentric distance, and e=12; R is a generating radius, and R=96.

A gas inlet 120, a gas inlet 140, and a gas inlet 160 are provided on the housing 10 at the junctions of the adjacent arc surfaces. Two sides of the housing 1 in an axial direction are provided with two end covers. The end cover on one side is provided with a gas discharge port 910, and the end cover on the other side is provided with a gas outlet 90. A relief valve is provided in the gas outlet 90.

The rotor 20 is rotatably provided in the housing 10. The rotor 20 is provided with four contact ends constantly in sliding contact with the inner surface 100 of the housing: a contact end 250, a contact end 260, a contact end 270, and a contact end 280, respectively. The contour line of the rotor 20 is obtained through the following equations:

$$x_r = e^*\cos\beta + e^*\cos(\alpha-\beta/3) + R^*\cos(\alpha/4-\beta/3)$$

$$y_r = e^*\cos\beta + e^*\sin(\alpha-\beta/3) + R^*\sin(\alpha/4-\beta/3)$$

$$tg(5\beta/8) = \frac{5\sin(\alpha/2) - K\sin(3\alpha/10)}{5\cos(\alpha/2) + K\cos(3\alpha/10)}$$

$\alpha \in [0°, 360°]$, e is an eccentric distance, and e=12; R is a generating radius, and R=96. K=R/e.

The rotor 20 and the inner surface 100 of the housing form sealed separate cavities between the adjacent contact ends. When the device is used for gas separation, the separate cavities are gas cavities, and when the device is used for liquid separation, the separate cavities are liquid cavities. For convenience of description, gas separation is taken as an example in the embodiment. A hollow part inside the rotor 20 is used as a gas storage chamber 40. The gas storage chamber 40 is divided into two parts by a divider 70: a gas storage chamber 410 and a gas storage chamber 420. The gas storage chamber 410 is configured to store the separated gas and the gas storage chamber 420 is configured to store the remaining gas. Referring to FIG. 19 and FIG. 20, the gas outlet 90 on one end surface of the housing 10 is in communication with the gas storage chamber 410 for discharging the separated gas, and the gas discharge port 910 on the other end surface of the housing 10 is in communication with the gas storage chamber 420 for discharging the remaining gas.

Separation chambers are provided inside the rotor 20 as a part of the rotor, one separation chamber is defined between the adjacent contact ends, and the separation chambers are isolated from each other. In the present embodiment, a separation chamber 320 is formed between the contact end 250 and the contact end 280, a separation chamber 340 is formed between the contact end 250 and the contact end 260, a separation chamber 360 is formed between the contact end 260 and the contact end 270, and a separation chamber 380 is formed between the contact end 270 and the contact end 280. Each of the separation chambers is filled with a flat membrane 50 therein for dividing the separation chamber into two spaces, one inner space and one outer space. One-way valves 3020, 3040, 3060, 3080 corresponding to the gas cavities are provided on outer walls of the separation chambers for communicating with the gas cavities. Referring to FIG. 18, gas outlets corresponding to the gas storage chamber 410 are provided on inner walls of the separation chambers, where a gas outlet 210 is provided on the inner wall of the separation chamber 320, a gas outlet 220 is provided on the inner wall of the separation chamber 340, a gas outlet 230 is provided on the inner wall of the separation chamber 360, and a gas outlet 240 is provided on the inner wall of the separation chamber 380. The gas outlet 210, the gas outlet 220, the gas outlet 230, and the gas outlet 240 are provided with one-way valves therein, and gas can only enter the gas storage chamber 410 from the separation chambers. Spaces between the flat membranes 50 in the four separation chambers and the outer walls of the separation chambers are in communication with the gas storage chamber 420 through conduits, where a conduit 810 is provided between the separation chamber 320 and the gas storage chamber 420, a conduit 820 is provided between the separation chamber 340 and the gas storage chamber 420, a conduit 830 is provided between the separation chamber 360 and the gas storage chamber 420, and a conduit 840 is provided between the separation chamber 380 and the gas storage chamber 420. The remaining gas enters the gas storage chamber 420 through the conduits, and gas discharge ends of the conduit 810, the conduit 820, the conduit 830, and the conduit 840 are provided with relief valves.

In the present embodiment, referring to FIG. 17, the center of the rotor 20 is not coincident with the center of the housing 10, and the center of the rotor 20 rotates about the center of the housing during rotation of the rotor 2. More specifically, the housing 10 is provided with an external gear 190 at the center thereof, and the rotor 20 is provided with an internal gear 290 at the center thereof, wherein the external gear 190 is meshed with the internal gear 290, and the external gear 190 has fewer teeth than the internal gear 290.

The working process of the flat-membrane gas separation device of the present invention is as follows.

Referring to FIG. 15 which shows an initial phase, the contact end 250 of the rotor 20 is at the clockwise side of the gas inlet 120, and the contact end 280 is at the counter-clockwise side of the gas inlet 120; that is, an air cavity B formed by the separation chamber 320, the contact ends 250 and 280 and the inner surface 100 of the housing is in an intake process of a new phase; the torque transmitted by the drive shaft 30 drives the external gear 190 to rotate and thus drives the rotor 20 to rotate clockwise, and after the contact end 280 on the rotor 20 moves clockwise and passes the gas inlet 120, the intake process is completed. During this process, the volume of the air cavity B gradually increases.

Referring to FIG. 19 and FIG. 21, a compression process and a gas output preparation phase are shown in FIG. 21. The contact end 250 slides to the gas inlet 140. As the rotor 20 continues rotating clockwise, the volume of the gas cavity B is further decreased. The gas cavity B further compresses gas to enter the separation chamber 320 and then pass through the flat membrane 50. Since different gases pass through the flat membrane at different rates under the same pressure, in one unit of time, more gases having faster permeation rate pass through the membrane than gases having slower permeation rate, thereby achieving the effect of gas separation. Referring to FIG. 19 and FIG. 20, the separated gas enters the gas storage chamber 410 through the gas outlet 210 and then exits through the gas outlet 90 on the end cover at this side. The remaining gas left in the separation chamber 320 is discharged to the gas storage chamber 420 through the conduit 810 and then is discharged through the gas discharge port 910 on the end cover at the other side. When the pressure of the remaining gas in the separation chamber 320 reaches a threshold of the relief valve at the gas discharge end of the conduit 810, the valve is closed to stop the gas discharge.

Referring to FIG. 22 which shows a new circulation phase, as the rotor 20 continuously rotates clockwise, the volume of the air cavity B gradually decreases; in this phase, the volume of the air cavity B reaches the minimum, and the phase proceeds to the intake, gas compression, and gas separation processes of the next phase.

Embodiment 4

Figure 23:
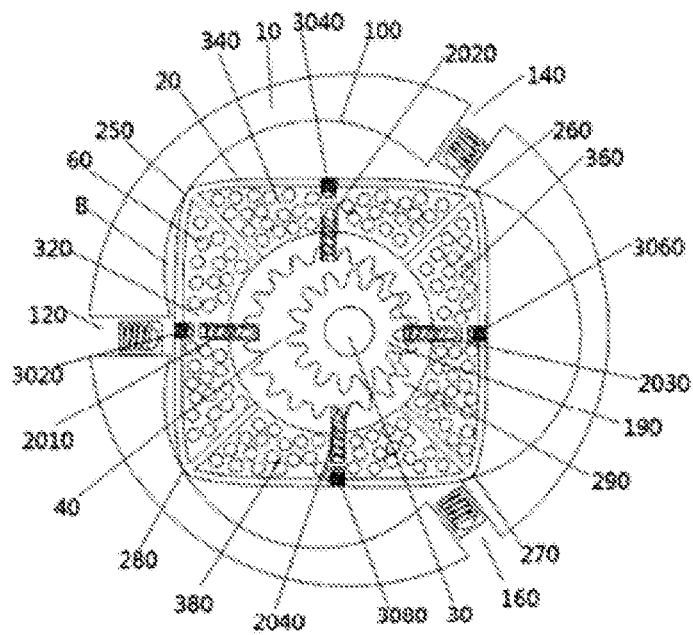
FIGS. 23-28 are schematic structural views of a tetragonal-rotor fiber tubular-membrane separation device according to an embodiment 4 of the present invention.
Figure 24:
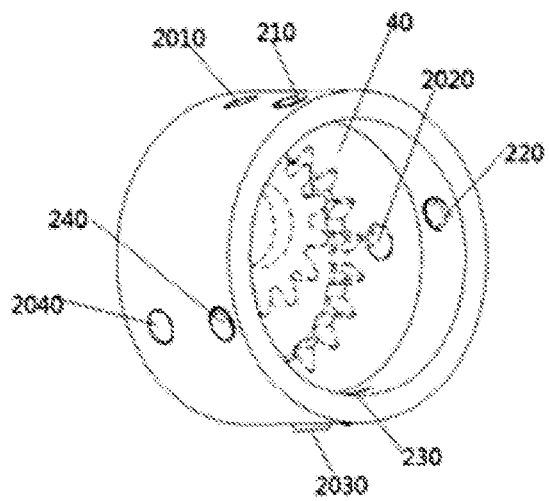
Figure 25:
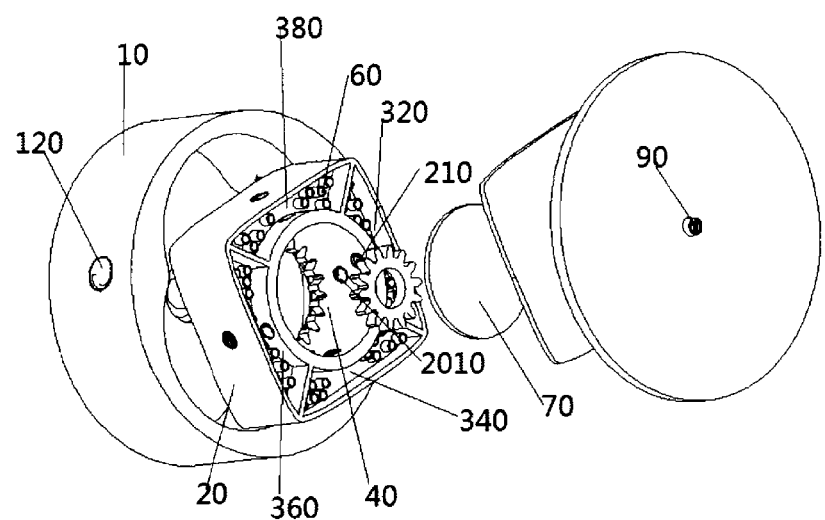
Figure 26:
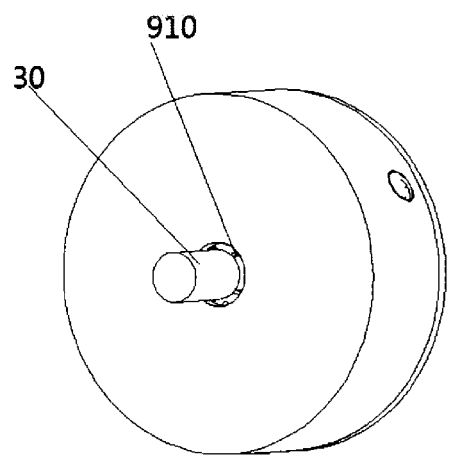
Figure 27:
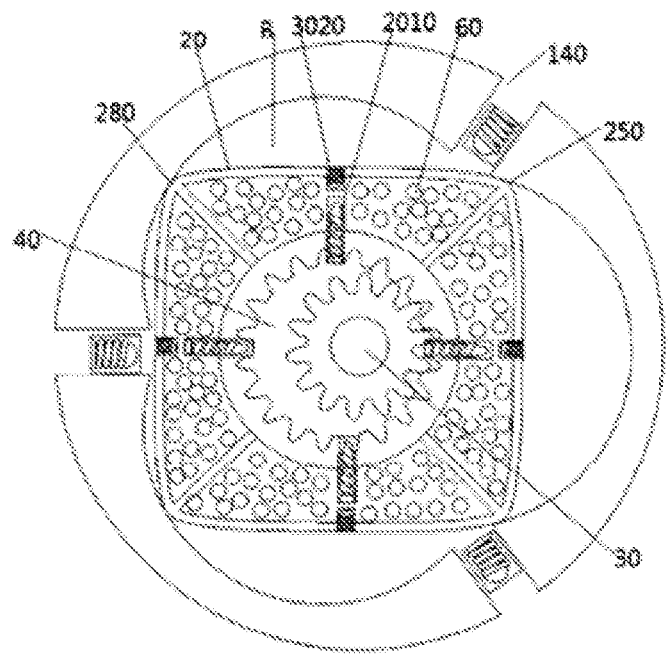
Figure 28:
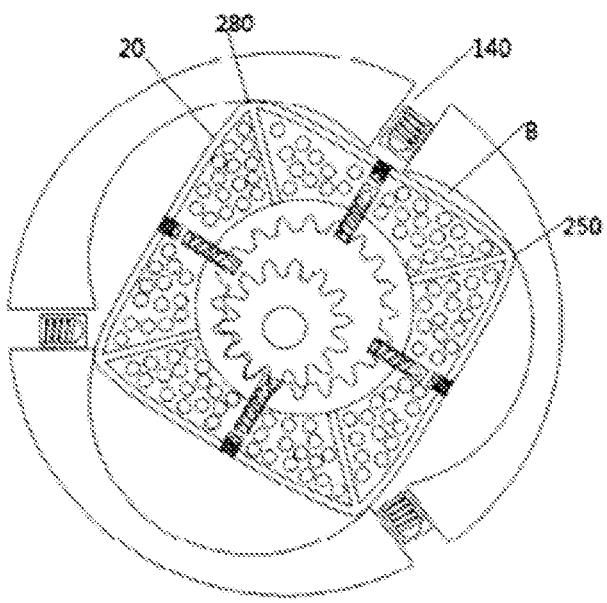

FIG. 23, FIG. 27, and FIG. 28 are front views of the hollow fiber tubular-membrane separation device of the present invention, FIG. 24 is an oblique view of a gas storage chamber module of the hollow fiber tubular-membrane separation device of the present invention, FIG. 25 is an overall exploded view of the hollow fiber tubular-membrane separation device of the present invention, and FIG. 26 is an oblique view of an end cover at one side of an gas discharge port of the hollow fiber tubular-membrane separation device of the present invention. The structure of the membrane separation device in the present embodiment is basically the same as that in the embodiment 3, and the only difference is that each of the separation chambers is filled with the hollow fiber tubular membrane 60 instead of the flat membrane 50 in the embodiment 3, where outlets of the hollow fiber tubular membranes 6 in the separation chambers are in communication with the gas outlets on the inner walls of the corresponding separation chambers, namely, the outlet of the hollow fiber tubular membrane 60 in the separation chamber 320 is in communication with the gas outlet 210 on the inner wall of the separation chamber 320, the outlet of the hollow fiber tubular membrane 60 in the separation chamber 340 is in communication with the gas outlet 220 on the inner wall of the separation chamber 340, the outlet of the hollow fiber tubular membrane 60 in the separation chamber 360 is in communication with the gas outlet 230 on the inner wall of the separation chamber 360, and the outlet of the hollow fiber tubular membrane 60 in the separation chamber 380 is in communication with the gas outlet 240 on the inner wall of the separation chamber 380. Because of the characteristics of the hollow fiber tubular membranes 60, it is not required to provide conduits in the embodiment 3 to discharge the remaining gas, and it only requires to provide gas discharge ports in communication with the gas storage chamber 420 on the inner walls of the separation chambers, where a gas discharge port 2010 is provided between the separation chamber 320 and the gas storage chamber 420, a gas discharge port 2020 is provided between the separation chamber 340 and the gas storage chamber 420, a gas discharge port 2030 is provided between the separation chamber 360 and the gas storage chamber 420, and a gas discharge port 2040 is provided between the separation chamber 380 and the gas storage chamber 420. The gas discharge port 2010, the gas discharge port 2020, the gas discharge port 2030, and the gas discharge port 2040 are provided with relief valves, see FIG. 24.

The working process of the hollow fiber tubular-membrane gas separation device of the present invention is as follows.

Referring to FIG. 23 which shows an initial phase, the contact end 250 of the rotor 20 is at the clockwise side of the gas inlet 120, and the contact end 280 is at the counterclockwise side of the gas inlet 120; that is, an air cavity B formed by the separation chamber 320, the contact ends 250 and 280 and the inner surface 100 of the housing is in an intake process of a new phase; the torque transmitted by the drive shaft 30 drives the external gear 190 to rotate and thus drives the rotor 20 to rotate clockwise, and after the contact end 280 on the rotor 20 moves clockwise and passes the gas inlet 120, the intake process is completed. During this process, the volume of the air cavity B gradually increases.

Referring to FIG. 25 and FIG. 27, a compression process and a gas output preparation phase are shown in FIG. 27. The contact end 240 slides to the gas inlet 140. As the rotor 20 continues rotating clockwise, the volume of the gas cavity B is further decreased. The gas cavity B further compresses gas to enter the separation chamber 320 and then pass through the hollow fiber tubular membrane 60. Since different gases pass through the tubular membrane at different rates, in one unit of time, more gases having faster permeation rate pass through the membrane than gases having slower permeation rate, thereby achieving the effect of gas separation. Referring to FIG. 25 and FIG. 26, the separated gas exits the outlet of the hollow fiber tubular membrane 60, enters the gas storage chamber 410 through the gas outlet 210 and then exits through the gas outlet 90 on the end cover at this side. The remaining gas enters the gas storage chamber 420 through the gas discharge port 2010 and then is discharged through the gas discharge port 910 on the end cover at the other side. When the pressure of the remaining gas in the separation chamber 320 reaches a threshold of the relief valve in the gas discharge port 2010 on the inner wall of the separation chamber 320, the valve is closed to stop the gas discharge.

Referring to FIG. 28 which shows a new circulation phase, as the rotor 20 continuously rotates clockwise, the volume of the air cavity B gradually decreases; in this phase, the volume of the air cavity B reaches the minimum.

Gas separation is taken as an example in all of the four embodiments above. The device is also applicable to liquid separation and in this case, the operation principle is identical to that of gas separation and thus will not be described further, except that when the structure and the operation principle of the device for use in liquid separation are described, all expressions related to "gas" should be changed into expressions related to "liquid". For example, the "gas cavity" is changed into the "liquid cavity", and the "gas inlet" and "gas discharge" are changed into the "liquid inlet" and "liquid discharge".

The above embodiments are only for illustrating technical concepts and features of the present invention, and aim at enabling those skilled in the art to understand and implement the content of the present invention, rather than to limit the scope of the present invention. All of the equivalent variations and modifications made according to the spirit of the present invention fall within the protection scope of the present invention.

The invention claimed is:
1. A membrane separation device, comprising:
a housing having an arc-shaped inner surface, the housing being provided with at least one medium inlet, at least one medium outlet used for discharging a separated medium, and at least one discharge port for discharging a remaining medium;
a rotor provided in the housing, wherein a center of the rotor is not coincident with a center of the housing, the center of the rotor rotates about the center of the housing during the rotation of the rotor, an external gear is fixed on a drive shaft at the center of the housing, the rotor is provided with an internal gear at the center thereof, the external gear is engaged with the internal gear, and the external gear has fewer teeth than the internal gear;
the rotor being provided with at least two contact ends on an outer surface thereof, the at least two contact ends being constantly in sliding contact with the inner surface of the housing, the outer surface of the rotor and the inner surface of the housing forming sealed separate cavities between adjacent contact ends, the separate cavities being separated by the contact ends,
wherein an inside of the rotor is hollow, a hollow part inside the rotor is used as a medium storage chamber and the medium storage chamber of the rotor is divided into two parts by a divider: a first medium storage chamber for storing the separated medium and a second medium storage chamber for storing the remaining medium;

separation chambers provided inside the rotor as a part of the rotor, a respective one of the separation chambers being defined between each adjacent pair of contact ends, each of the separation chambers being provided with a membrane therein for dividing the separation chambers into an inner part and an outer part;

respective one-way valves provided on outer walls of the separation chambers for communicating with the separate cavities;

medium outlets provided on inner walls of the separation chambers to connect respective inner parts of the separation chambers to the first medium storage chamber, the first medium storage chamber being in communication with the at least one medium outlet on the housing;

conduits extending from the outer parts of the separation chambers to connect respective outer parts of the separation chambers to the second medium storage chamber, the second medium storage chamber being in communication with the at least one medium discharge port on the housing;

wherein during a rotation of the rotor, a medium entering the separate cavities through the medium inlets on the housing enters the outer parts of the separation chambers through the one-way valves by pressure, separated medium passes from the outer parts of the separation chambers through the membranes into the inner parts of the separation chambers, passes through the medium outlets provided on the inner walls of the separation chamber into the first medium storage chamber, and then exits through the at least one medium outlet on the housing, and remaining medium passes from the outer parts of the separation chambers through the conduits, enters the second medium storage chamber, and is then discharged through the at least one medium discharge port on the housing.

2. The membrane separation device of claim 1, wherein a flat membrane is used as the membrane, and when the flat membrane is used, the separated medium passes through the flat membrane to enter the gas first medium storage chamber from the medium outlets provided on the inner walls of the separation chambers.

3. The membrane separation device of claim 1, wherein at least one hollow fiber tubular membrane is used as the membrane, and when the hollow fiber tubular membrane is used, outlets of the at least one hollow fiber tubular membrane are in communication with the medium outlets on the inner walls of the separation chambers, and the separated medium passes through at least one tube of the at least one hollow fiber tubular membrane and then enters the second medium storage chamber.

4. The membrane separation device of claim 1, wherein the housing has a symmetrical arc-shaped inner surface, and an arc-shaped trajectory of the inner surface is obtained through the following equations:

$$x = R^* \cos \alpha + e^* \cos 3\alpha;$$

$$y = R^* \sin \alpha + e^* \sin 3\alpha;$$

the contour line of the rotor is obtained through the following equations:

$$v = 30 + t^* 60$$

$$d = -3^* e^* \sin(3^* v)/R$$

$$u = 2^* v - a \sin(d)$$

$$x = 2^* e^* \cos(u)^* \cos(3^* v) + R^* \cos(2^* v)$$

$$y = 2^* e^* \sin(u)^* \cos(3^* v) + R^* \sin(2^* v)$$

in the above equations, R is a generating radius, e is a distance between the center of the rotor and the center of the housing, $\alpha \in [0°, 360°]$, and t is time.

5. The membrane separation device of claim 4, wherein each of two sides of the housing in a radial direction is provided with a gas inlet respectively, and two sides of the housing in an axial direction are provided with an end cover respectively; the end cover on one side is provided with an end surface medium discharge port, and the end cover on the other side is provided with an end surface medium outlet; the rotor is provided with three contact ends constantly in sliding contact with the inner surface of the housing; the separated medium passes through the membranes in the separation chambers and enters the first medium storage chamber, and a remaining medium enters the second medium storage chamber; the end surface medium outlet is in communication with the first medium storage chamber, and the end surface medium discharge port is in communication with the second medium storage chamber.

6. The membrane separation device of claim 1, wherein an arc-shaped trajectory of the inner surface of the housing is obtained through the following equations:

$$x = e^* \cos(\alpha) + R^* \cos(\alpha/4)$$

$$Y = e^* \sin(\alpha) + R^* \sin(\alpha/4)$$

the contour line of the rotor is obtained through the following equations:

$$x_r = e^* \cos \beta + e^* \cos(\alpha - \beta/3) + R^* \cos(\alpha/4 - \beta/3)$$

$$y_r = e^* \cos \beta + e^* \sin(\alpha - \beta/3) + R^* \sin(\alpha/4 - \beta/3)$$

$$tg(5\beta/8) = \frac{5\sin(\alpha/2) - K \sin(3\alpha/10)}{5\cos(\alpha/2) + K \cos(3\alpha/10)}$$

in the above equations, $\alpha \in [0°, 360°]$, e is an eccentric distance, R is a generating radius, and K=R/e.

7. The membrane separation device according to claim 6, wherein the inner surface of the housing has three arcuate surfaces and three gas inlets at the respective junctions of the arcuate surfaces, and wherein the rotor has four contact ends in sliding contact with the inner surface of the housing.

8. A method of separating a fraction of a liquid or gas mixture using the device according to any preceding claim, comprising:
    driving the rotor of the device;
    admitting the liquid or gas mixture into the device via the at least one medium inlet; and
    collecting the separated fraction of the liquid or gas mixture at the at least one medium outlet provided on the housing.

* * * * *